(12) United States Patent
Chou et al.

(10) Patent No.: US 11,235,629 B2
(45) Date of Patent: Feb. 1, 2022

(54) ANTI-JET JOINT STRUCTURE OF CONNECTION HOSE OF VEHICLE AIR COMPRESSOR

(71) Applicants: Wen-San Chou, Tainan (TW); Cheng-Hsien Chou, Tainan (TW)

(72) Inventors: Wen-San Chou, Tainan (TW); Cheng-Hsien Chou, Tainan (TW)

(*) Notice: Subject to any disclaimer, the term of this patent is extended or adjusted under 35 U.S.C. 154(b) by 0 days.

(21) Appl. No.: 16/882,715

(22) Filed: May 25, 2020

(65) Prior Publication Data
US 2020/0376908 A1 Dec. 3, 2020

(30) Foreign Application Priority Data
May 30, 2019 (TW) .................................. 108118851

(51) Int. Cl.
| | |
|---|---|
| *B60C 29/06* | (2006.01) |
| *B29C 73/02* | (2006.01) |
| *B29C 73/16* | (2006.01) |
| *B60C 25/00* | (2006.01) |
| *B60S 5/04* | (2006.01) |
| *B29L 30/00* | (2006.01) |

(52) U.S. Cl.
CPC .......... *B60C 29/062* (2013.01); *B29C 73/025* (2013.01); *B29C 73/166* (2013.01); *B60C 25/16* (2013.01); *B60S 5/04* (2013.01); *B29L 2030/00* (2013.01)

(58) Field of Classification Search
CPC ... B60C 29/064; B60C 29/062; B29C 73/166; B60S 5/04; B29L 2030/00; F16K 15/20; Y10T 137/3724

USPC .......................................................... 141/38
See application file for complete search history.

(56) References Cited

U.S. PATENT DOCUMENTS

| | | | | |
|---|---|---|---|---|
| 6,260,572 B1* | 7/2001 | Wu | ....................... | F04B 33/005 137/223 |
| 6,786,247 B1* | 9/2004 | Kemppainen | ......... | F04B 33/005 137/223 |
| 6,904,932 B1* | 6/2005 | Haraughty | .............. | F16K 15/20 137/231 |
| 8,627,857 B2* | 1/2014 | Chou | ..................... | B60S 5/046 141/38 |
| 8,757,194 B2* | 6/2014 | Huang | ................... | B60C 29/06 137/231 |
| 10,029,429 B2* | 7/2018 | Eckhardt | ............... | B60C 29/064 |

(Continued)

*Primary Examiner* — Timothy P. Kelly

(57) ABSTRACT

An anti-jet joint structure of a connection hose of a vehicle air compressor contains: an accommodation box, an adhesive supply can, and a connection hose. The accommodation box accommodates the vehicle air compressor started by a power to produce air. The adhesive supply can accommodates chemical adhesive for repairing a tire, and the adhesive supply can includes an open segment and a supply hose. The connection hose includes a first joint and a second joint opposite to the first joint. The first joint is engaged with the supply hose, and the second joint is screwed with a gas nozzle of the tire. The second joint is the anti-jet joint structure and has a first connection assembly and a second assembly. The first connection assembly is connected with or is removed from the second connection assembly having different interior structures and volumes so as to mate with various tires.

10 Claims, 11 Drawing Sheets

(56) References Cited

U.S. PATENT DOCUMENTS

| | | | | |
|---|---|---|---|---|
| 2008/0190489 A1* | 8/2008 | Wrubel | ............... | F16L 37/1215 |
| | | | | 137/231 |
| 2011/0011217 A1* | 1/2011 | Kojima | ................. | B29C 73/166 |
| | | | | 81/15.2 |
| 2013/0105055 A1* | 5/2013 | Chou | ....................... | B60S 5/043 |
| | | | | 152/416 |
| 2013/0284312 A1* | 10/2013 | Chou | ....................... | F16K 15/20 |
| | | | | 141/38 |
| 2015/0151594 A1* | 6/2015 | Hong | .................... | B29C 73/166 |
| | | | | 141/38 |
| 2016/0136906 A1* | 5/2016 | Chou | .................... | B29C 73/166 |
| | | | | 141/38 |
| 2019/0100062 A1* | 4/2019 | Kuo | ....................... | F16K 15/207 |
| 2019/0193349 A1* | 6/2019 | Chou | .................... | B29C 73/166 |
| 2020/0368980 A1* | 11/2020 | Dowel | ................... | F16K 15/026 |
| 2020/0376908 A1* | 12/2020 | Chou | ....................... | F16L 35/00 |

\* cited by examiner

US 11,235,629 B2

1

ANTI-JET JOINT STRUCTURE OF CONNECTION HOSE OF VEHICLE AIR COMPRESSOR

FIELD OF THE INVENTION

The present invention relates to an anti jet joint structure of a connection hose of a vehicle air compressor which is configured to feed chemical adhesive and inflate air into a tire, thus repairing the tire.

BACKGROUND OF THE INVENTION

A conventional vehicle air compressor is employed to feed chemical adhesive and air into a broken tire so as to repair the broken tire. The vehicle air compressor contains a button arranged on an accommodation box. However, when the button is pressed and a connection hose is not connected with an air nozzle of the tire, the chemical adhesive erupts out of a joint on an end of the connection hose suddenly.

The present invention has arisen to mitigate and/or obviate the afore-described disadvantages.

SUMMARY OF THE INVENTION

The primary aspect of the present invention is to provide an anti jet joint structure of a connection hose of a vehicle air compressor which contains an accommodation box configured to accommodate a vehicle air compressor, an adhesive supply can for accommodating chemical adhesive, and at least one connection hose, wherein a respective connection hose has a joint arranged on at least one end of thereof so as to prevent eruption of the chemical adhesive.

Another aspect of the present invention is to provide an anti jet joint structure of a connection hose of a vehicle air compressor which contains a first connection assembly and a second assembly, wherein the first connection assembly is connected with or is removed from the second connection assembly having different interior structures and volumes so as to mate with various tires.

2

Figure 7:
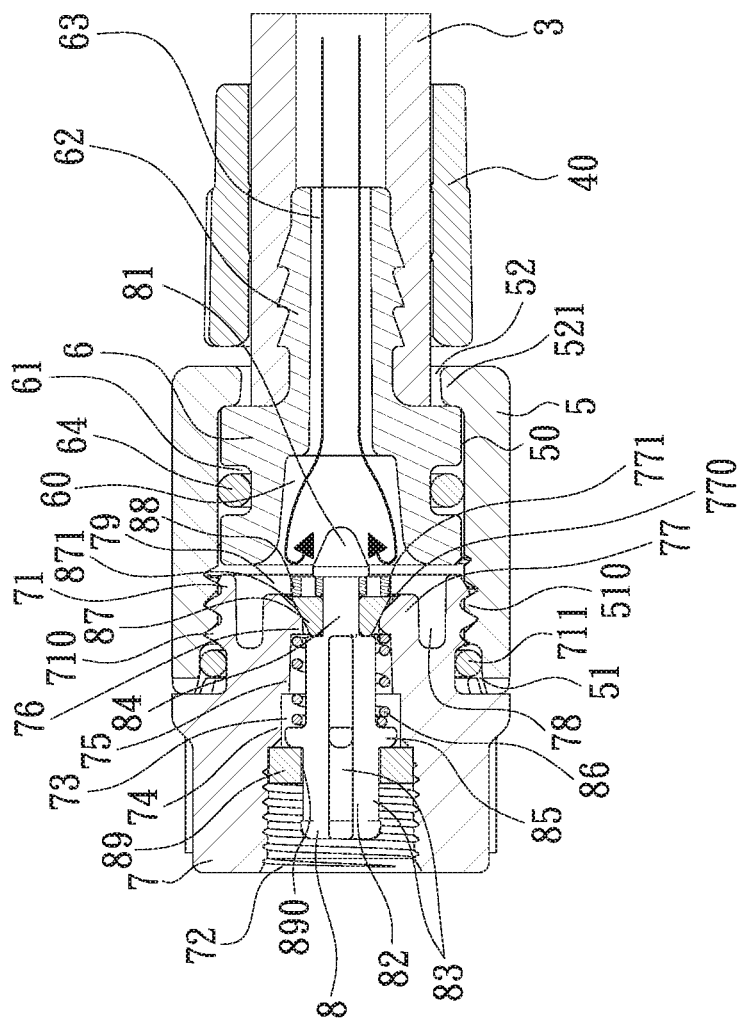

FIG. 7 is a cross sectional view showing the assembly of the anti jet joint structure of the connection hose of the vehicle air compressor according to the preferred embodiment of the present invention.

Figure 8:
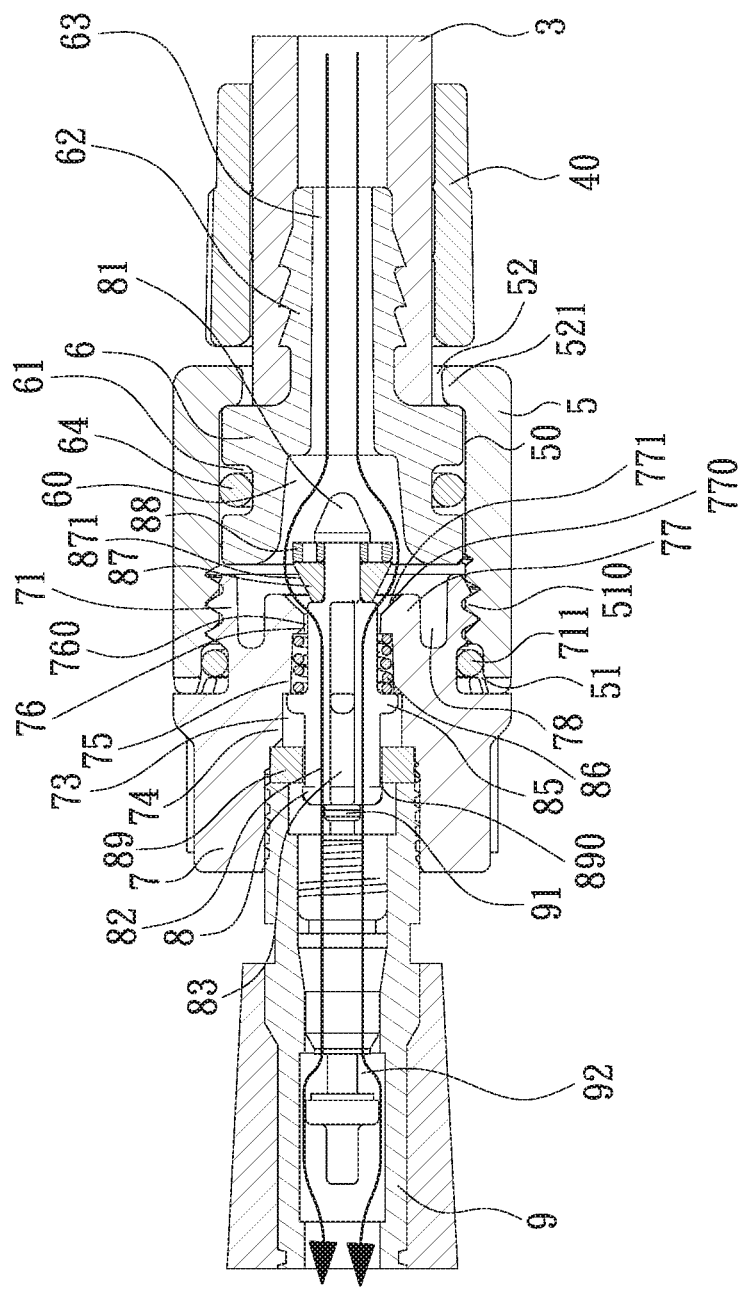

FIG. 8 is a cross-sectional view showing the operation of the anti-jet joint structure of the connection hose of the vehicle air compressor according to the preferred embodiment of the present invention.

Figure 9:
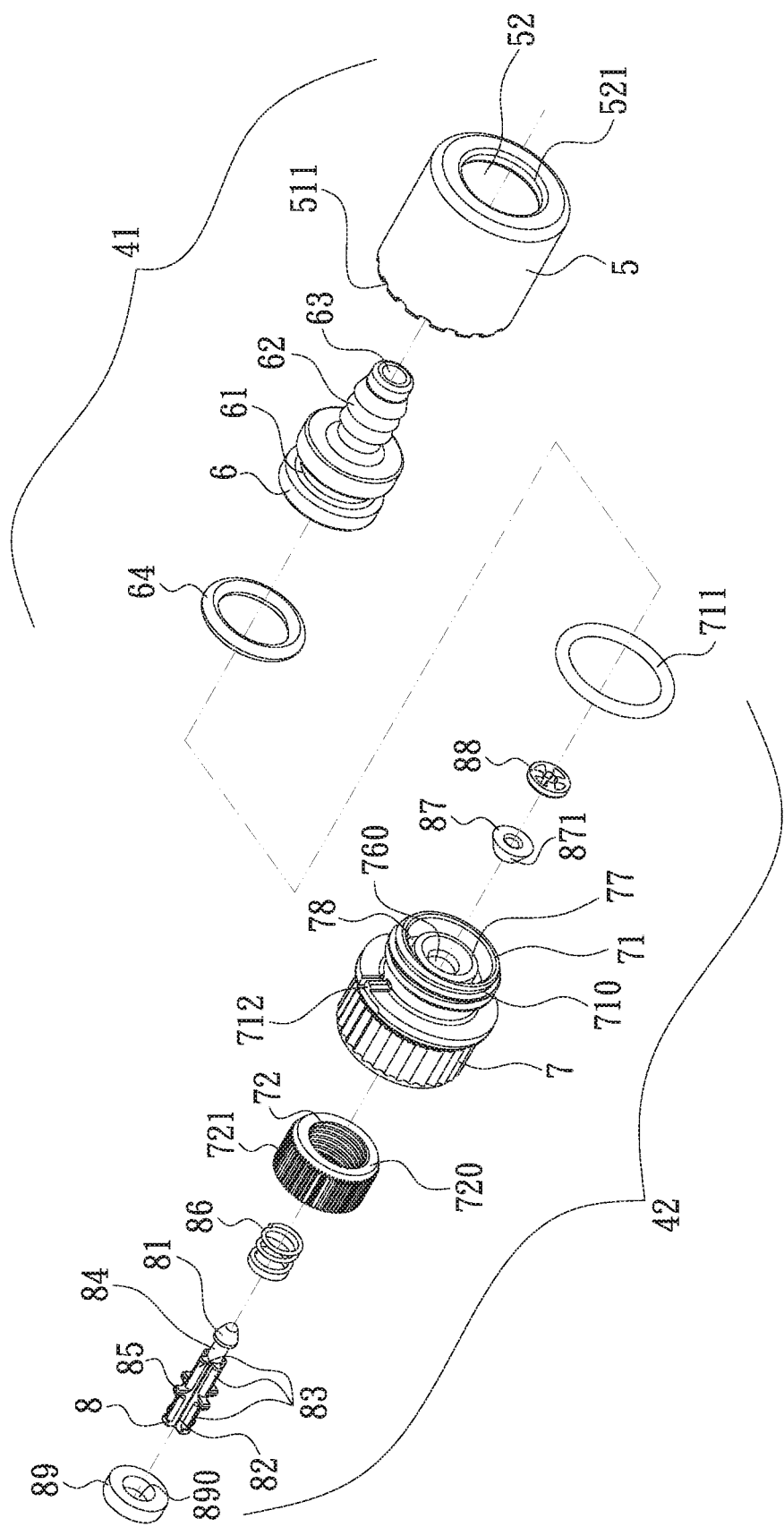

FIG. 9 is a perspective view showing the exploded components of an anti jet joint structure of a connection hose of a vehicle air compressor according to another preferred embodiment of the present invention.

Figure 10:
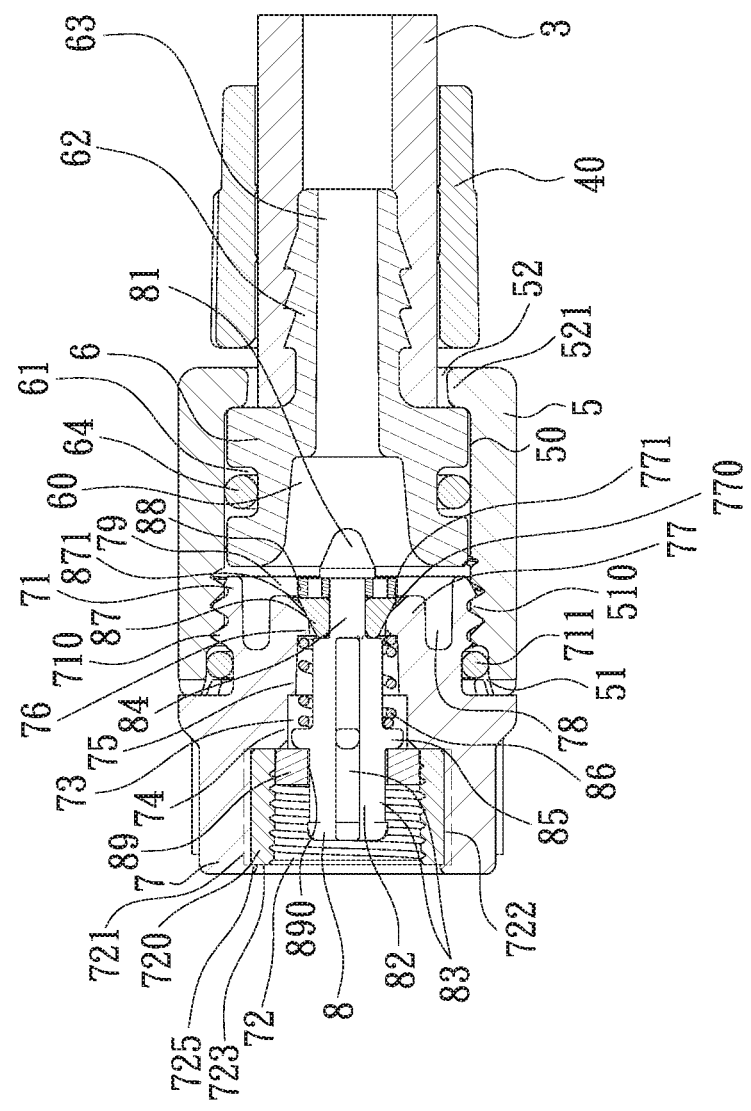

FIG. 10 is a cross sectional view showing the assembly of the anti jet joint structure of the connection hose of the vehicle air compressor according to another preferred embodiment of the present invention.

Figure 11:
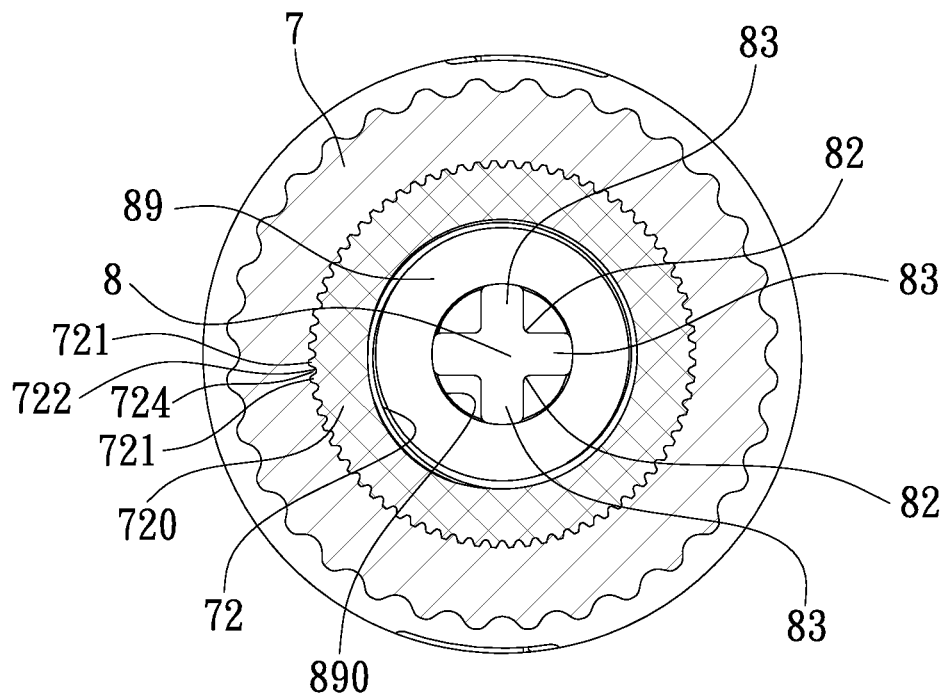

FIG. 11 is another cross sectional view showing the assembly of the anti jet joint structure of the connection hose of the vehicle air compressor according to another preferred embodiment of the present invention.

DETAILED DESCRIPTION OF THE PREFERRED EMBODIMENTS

Figure 1:
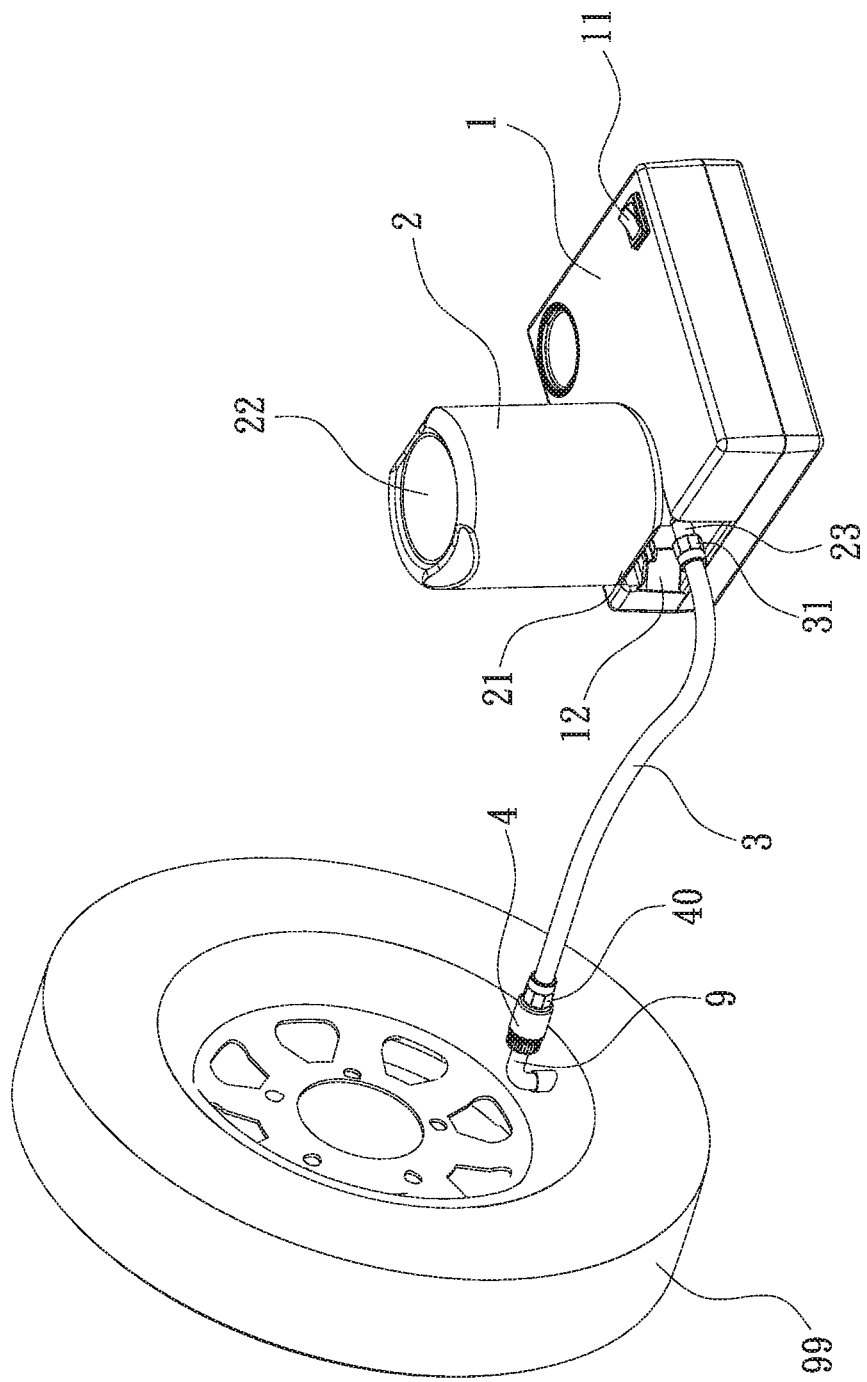
FIG. 1 is a perspective view showing the application of an anti-jet joint structure of a connection hose of a vehicle air compressor according to a preferred embodiment of the present invention.
Figure 2:
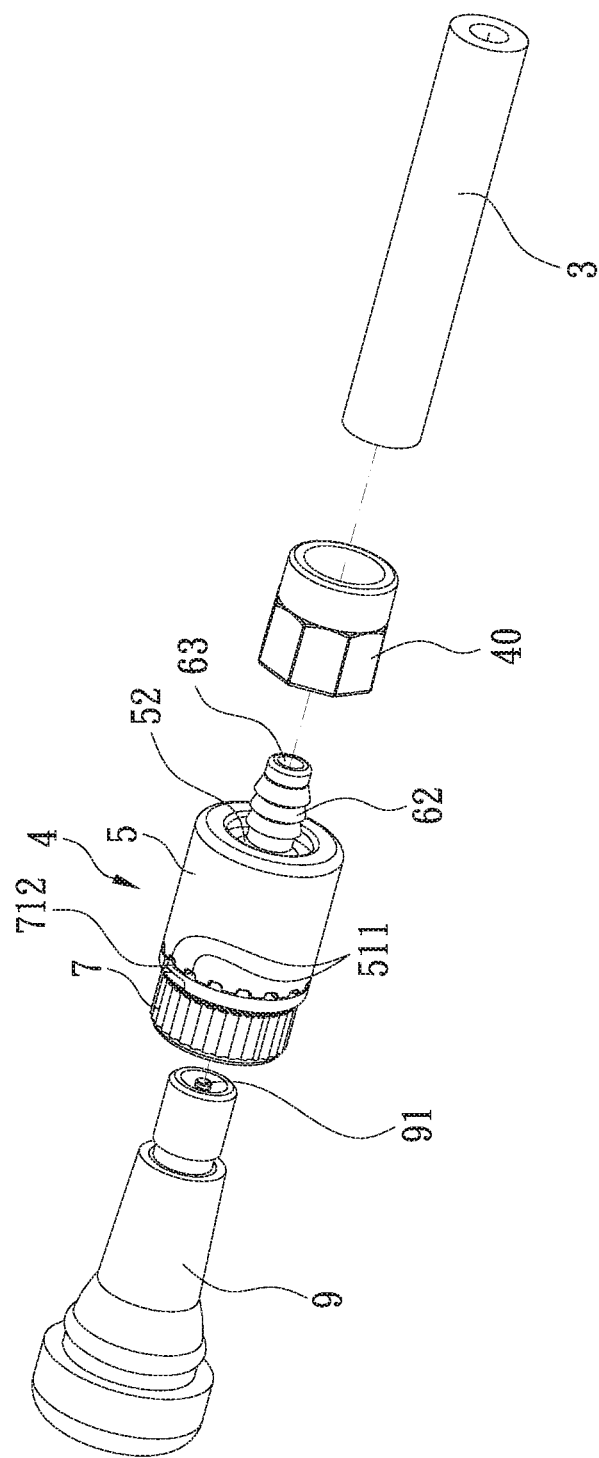
FIG. 2 is another perspective view showing the application of the anti-jet joint structure of the connection hose of the vehicle air compressor according to the preferred embodiment of the present invention.
Figure 3:
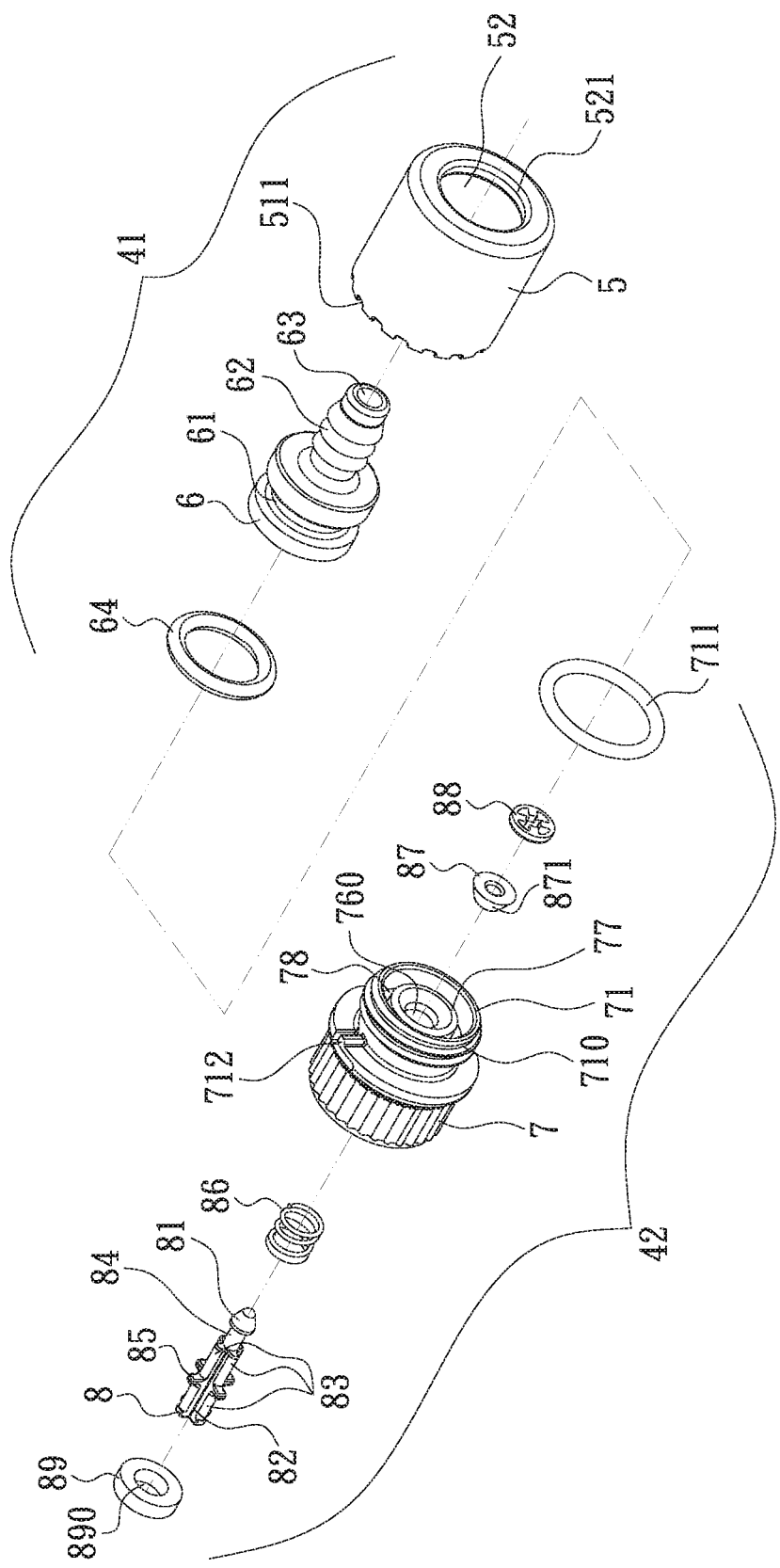
FIG. 3 is a perspective view showing the exploded components of the anti-jet joint structure of the connection hose of the vehicle air compressor according to the preferred embodiment of the present invention.

With reference to FIGS. 1-3, an anti-jet joint structure of a connection hose of a vehicle air compressor according to a preferred embodiment of the present invention comprises: an accommodation box 1, an adhesive supply can 2, and a connection hose 3.

The accommodation box 1 includes a button 11 arranged on a top thereof and has a coupling orifice 12 defined on a peripheral side of the accommodation box 1, wherein the accommodation box 1 accommodates the vehicle air compressor (not shown). The connection hose 3 includes a first joint 31 connected on a first end thereof, and the connection hose 3 includes a second joint 4 fixed on a second end thereof and configured to prevent eruption of chemical adhesive. The adhesive supply can 2 is mounted on the coupling orifice 12 of the accommodation box 1, wherein an open segment 21 is formed on a bottom of the adhesive can 2 and faces the coupling orifice 12 of the accommodation box 1, and an edge 22 is adjacent to a top of the adhesive supply can 2. The first joint 31 of the connection hose 3 is engaged with a supply hose 23 of the adhesive supply can 2. When repairing and inflating air into a tire, the second joint 4 of the connection hose 3 is screwed with a gas nozzle 9 of the tire 99. After the accommodation box 1 is started by a power from a vehicle or a DC power supply, the vehicle air compressor produces the air to force the chemical adhesive into the tire 99 from the adhesive supply can 2 via the connection hose 3, thus repairing and inflating the air into the tire 99.

Figure 5:
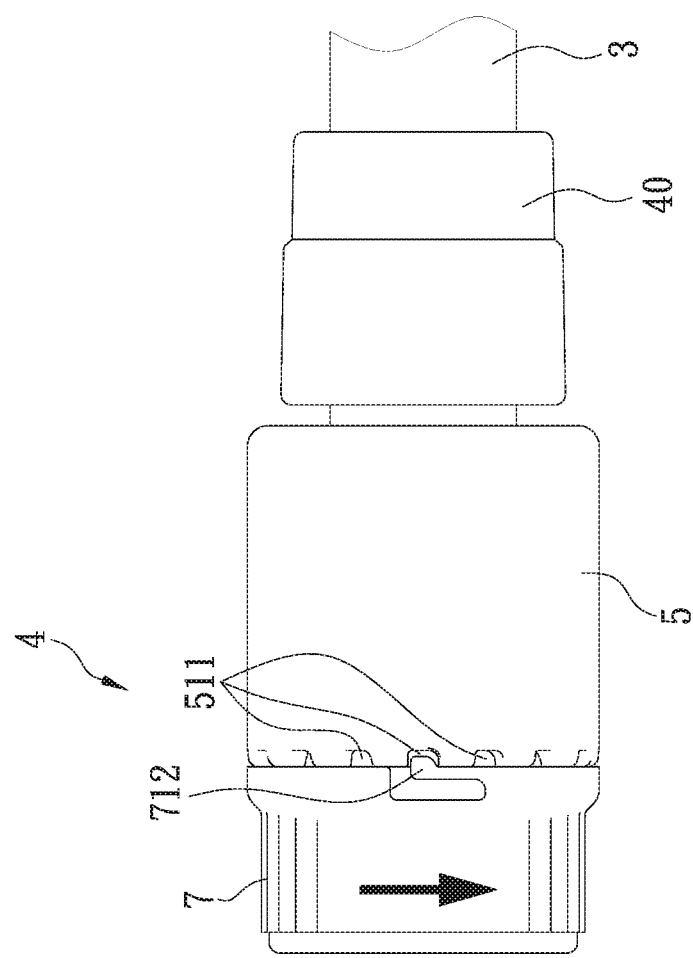
FIG. 5 is a side plan view showing the assembly of the anti-jet joint structure of the connection hose of the vehicle air compressor according to the preferred embodiment of the present invention.

Referring to FIGS. 2, 3 and 5, to prevent the eruption of the chemical adhesive, the connection hose 3 includes the second joint 4 which is the anti-jet joint structure, and the second joint 4 has a first connection assembly 41 and a second assembly 42, wherein the first connection assembly 41 is connected with or is removed from the second connection assembly 42 having different interior structures and volumes so as to mate with various tires, such as the tire 99.

As shown in FIGS. 3-8, the first connection assembly 41 includes a first fitting sleeve 5 and a base 5, wherein the first fitting sleeve 5 has a chamber 50 defined therein, a first opening 51 defined on a first end of the first fitting sleeve 5, female threads 510 formed on an inner wall of the first fitting sleeve 5, multiple recesses 511 formed on a distal end of the first opening 51, and a through hole 52 defined on a second end of the first fitting sleeve 5, wherein a rib 521 extends inward from the through hole 52, and the through hole 52 communicates with the chamber 50. The base 6 includes a cylindrical room 60, a groove 61 formed on an outer wall of the base 6, a stepped extension 62 extending from the outer wall of the base 6 away from the groove 61, a channel 63 defined on a center of the stepped extension 62 and communicating with the cylindrical room 60, and a first seal ring 64 fitted on the groove 61 of the base 6.

Figure 6:
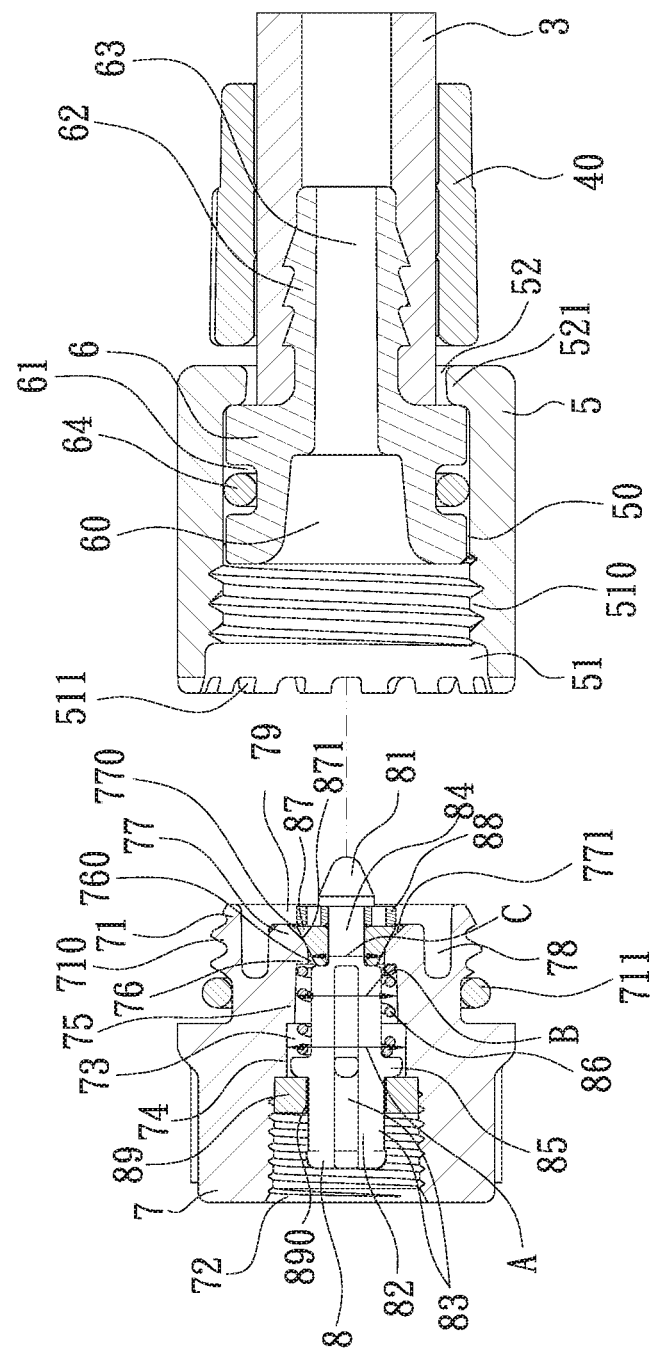
FIG. 6 is a cross sectional view showing the exploded components of the anti jet joint structure of the connection hose of the vehicle air compressor according to the preferred embodiment of the present invention.

The stepped extension 62 of the base 6 is inserted into the through hole 52 from the first opening 51 of the first fitting sleeve 5 via the chamber 50 and extends out of the first fitting sleeve 5 to fit with the connection hose 3, and the connection hose 3 and the second joint 4 are connected by a fixing ring 40, as illustrated in FIG. 6.

The second connection assembly 42 includes a second fitting sleeve 7 and a valve bolt 8. The second fitting sleeve 7 includes a locating segment 71 formed on a first end thereof and having male threads 710, a threaded hole 72 defined on a second end of the second fitting sleeve 7 opposite to the locating segment 71, at least one retainer 712 defined between the locating segment 71 and the threaded hole 72, and a passage 73 extending inside the first end of the second fitting sleeve 7, wherein a diameter of the passage 73 is less than a diameter of the threaded hole 72. The second fitting sleeve 7 further includes a first stepped shoulder 74 defined between the threaded hole 72 and the passage 73, a second stepped shoulder 75 extending opposite to the first stepped shoulder 74, a stop shoulder 76 extending opposite to the second stepped shoulder 75 and having an aperture 760. A diameter A of the first stepped shoulder 74 is more than a diameter B of the second stepped shoulder 75, and the diameter B of the second stepped shoulder 75 is more than a diameter C of the aperture 760 of the stop shoulder 76. The passage 73 has a valve seat 77 extending thereon, a second opening 770 formed on a distal end of the valve seat 77, a conical fence 771 formed on the second opening 770, a circular slit 78 defined between an outer wall of the valve seat 77 and an inner wall of the locating segment 71, and a cavity 79 formed between the valve seat 77 and the locating segment 71, wherein the threaded hole 72, the passage 73, the aperture 760 of the stop shoulder 76, the second opening 770 of the valve seat 77, the circular slit 78, and the cavity 79 communicate with one another.

Figure 4:
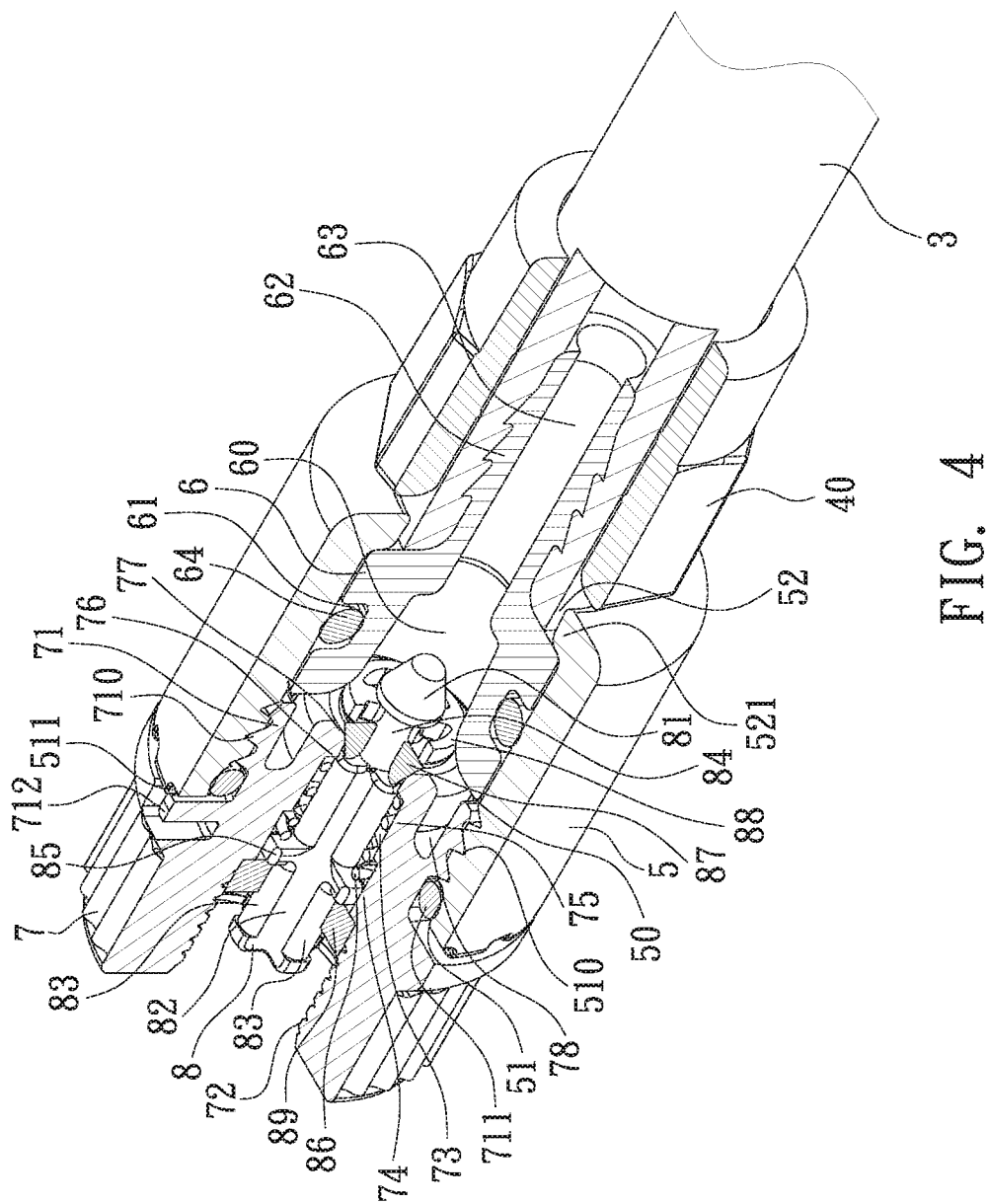
FIG. 4 is a cross-sectional perspective view showing the exploded components of the anti-jet joint structure of the connection hose of the vehicle air compressor according to the preferred embodiment of the present invention.

The valve bolt 8 is cylindrical and includes a knob 81 formed on an end thereof, and the valve bolt 8 includes multiple indentations 82 separately arranged thereon and includes multiple flanges 83, wherein a respective one flange 83 of the multiple flanges 83 is defined between any two adjacent indentations 82 of the multiple indentations 82, the respective one flange 83 has a tab 85 extending therefrom, and a recessed section 84 is defined among the knob 81 and the multiple flanges 83. The valve bolt 8 further includes a spring 86 fitted from the knob 81 to abut against the tab 85, and the valve bolt 8 is accommodated into the passage 73 from the threaded hole 72 so that the spring 86 contacts with the stop shoulder 76 and is surrounded by the second stepped shoulder 75. The valve bolt 8 includes a cap 87 fitted on the recessed section 84 of the valve bolt 8, and the cap 87 has a cone-shaped face 871 formed on an outer wall of the cap 87 and configured to abut against a connection portion of the conical fence 771 and the stop shoulder 76. The valve bolt 8 includes a locking disc 88 engaged on the recessed section 84 between the cap 87 and the knob 81, a washer 89 having a bore 890 and fitted into the threaded hole 72 of the second fitting sleeve 7 to abut against the first stepped shoulder 74 by ways of the bore 890, wherein the tab 85 of the valve bolt 8 moves in the passage 73 of the first stepped shoulder 74, and a second seal ring 711 is fitted with the locating segment 71 of the second fitting sleeve 7, such that the second seal ring 711, the spring 86, the cap 87, the washer 89, and the locating segment 71 of the second fitting sleeve 7 are accommodated into the first connection assembly 41, wherein the locating segment 71 is screwed with the first opening 51 in which the base 6 is received, in other words, the male threads 710 of the locating segment 71 are screwed with the female threads 510 of the first opening 51 of the first fitting sleeve 5, and the at least one retainer 712 of the second fitting sleeve 7 is retained with the multiple recesses 511 of the first fitting sleeve 5, as shown in FIGS. 3-5, hence the first connection assembly 41 and the second assembly 42 are connected firmly. In another embodiment, the diameter A of the first stepped shoulder 74 is equal to the diameter B of the second stepped shoulder 75, and the diameter B of the second stepped shoulder 75 is more than the diameter C of the aperture 760 of the stop shoulder 76.

With reference to FIG. 7, when the button 11 of the accommodation box 1 is pressed so that the chemical adhesive is forced by the air, the cone-shaped face 871 of the cap 87 abuts against the connection portion of the conical fence 771 and the stop shoulder 76 matingly, hence the chemical adhesive is stopped flowing through the aperture 760 of the stop shoulder 76, thus preventing the eruption of the chemical adhesive.

Referring to FIGS. 1-8, when the threaded hole 72 of the second joint 4 is screwed with the gas nozzle 9 of the tire 99, the valve bolt 8 of the second joint 4 forces a needle 91 of the gas nozzle 9 of the tire 99 to move, hence a valve 92 of the gas nozzle 9 is opened. In addition, the tab 85 of the valve bolt 8 contacts with the first stepped shoulder 74 of the second fitting sleeve 7, and the valve bolt 8 presses the spring 86 so that the cone-shaped face 871 of the cap 87 removes from the connection portion of the conical fence 771 of the valve seat 77 of the second fitting sleeve 7 and the stop shoulder 76 matingly, and the chemical adhesive flows into the tire from the aperture 760 of the stop shoulder 76 via the channel 63 of the base 6, the cylindrical room 60, the multiple indentations 82 of the valve bolt 8, the passage 73, the bore 890 of the washer 89, the threaded hole 72, and the valve 92 of the gas nozzle 9, thus feeding the chemical adhesive and inflating the air into the tire.

As shown in FIGS. 9-11, in another embodiment, a nut 720 is accommodated in the second end of the second fitting sleeve 7 opposite to the locating segment 71, and the nut 720 has multiple teeth 721 longitudinally formed on an outer wall thereof, wherein a respective one of multiple cutouts 722 is defined between any two adjacent teeth 721, and the respective one cutout 722 is engaged with a respective one of multiple defining wings 724 of the second fitting sleeve 7, as shown in FIG. 11, such that the nut 720 is connected with the second fitting sleeve 7 securely. As illustrated in FIG. 10, a limitation protrusion 725 is formed on the second end of the second fitting sleeve 7 opposite to the locating segment 71 so as to contact with an external fringe 723 of the nut 720, and the washer 89 is accommodated into the nut 702 to contact with the first stepped shoulder 74 of the second fitting sleeve 7.

Thereby, the second joint 4 is fixed on the second end of the connection hose 3 and is configured to feed the chemical adhesive, inflate the air, and prevent eruption of chemical adhesive to the tire 99. Preferably, the first connection assembly 41 of the second joint 4 is connected with or is removed from the second connection assembly 42 of the second joint 4 so as to mate with the tire 99.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. An anti-jet joint structure of a connection hose for a vehicle air compressor, comprising:
    a first connection assembly, and
    a second assembly, the first connection assembly removably connected with the second connection assembly;
    wherein the first connection assembly includes a first fitting sleeve and a base,
    the first fitting sleeve having a chamber defined therein, a first opening defined on a first end of the first fitting sleeve, female threads formed on an inner wall of the first fitting sleeve, and a through hole defined on a second end of the first fitting sleeve, wherein a rib extends inward from the through hole, and the through hole communicates with the chamber;
    the base includes a cylindrical room, a groove formed on an outer wall of the base, a stepped extension extending from the outer wall of the base away from the groove, a channel defined on in a center of the stepped extension and communicating with the cylindrical room, and a first seal ring fitted on the groove of the base;
    the stepped extension of the base is inserted into the through hole from the first opening of the first fitting sleeve via the chamber and extends out of from the first fitting sleeve to fit with the connection hose,
    wherein the second connection assembly includes: a second fitting sleeve and a valve bolt,
    the second fitting sleeve including
        a locating segment formed on a first end thereof and having male threads,
        a threaded hole defined on a second end of the second fitting sleeve opposite the locating segment, and
        a passage extending inside the first end of the second fitting sleeve, wherein a diameter of the passage is less than a diameter of the threaded hole, the second fitting sleeve further including
        a first stepped shoulder defined between the threaded hole and the passage,
        a second stepped shoulder extending away from the first stepped shoulder,
        a stop shoulder extending away from the second stepped shoulder and having an aperture,
        wherein the passage has a valve seat thereon,
        a second opening formed on a distal end of the valve seat,
        a conical fence formed on the second opening,
        a circular slit defined between an outer wall of the valve seat and an inner wall of the locating segment, and
        a cavity formed between the valve seat and the locating segment,
        wherein the threaded hole, the passage, the aperture of the stop shoulder, the second opening of the valve seat, the circular slit, and the cavity are in communication with one another.

2. The anti-jet joint structure as claimed in claim 1, wherein a diameter A of the first stepped shoulder is greater than a diameter B of the second stepped shoulder, and the diameter B of the second stepped shoulder is greater than a diameter C of the aperture of the stop shoulder.

3. The anti-jet joint structure as claimed in claim 1, wherein the valve bolt is cylindrical and includes a knob formed on an end thereof, and the valve bolt includes multiple indentations arranged thereon and further includes a respective flange defined between any two adjacent indentations of the multiple indentations, each flange comprising a tab extending therefrom, and a recessed section is defined between the knob and the flanges.

4. The anti-jet joint structure as claimed in claim 3, wherein the valve bolt further includes a spring fitted from the knob to abut against the tab, and the valve bolt is accommodated into the passage from the threaded hole so that the spring contacts with the stop shoulder and is surrounded by the second stepped shoulder; wherein the valve bolt includes a cap fitted on the recessed section of the valve bolt, and the cap has a cone-shaped face formed on an outer wall of the cap and configured to abut against a connection portion of the conical fence and the stop shoulder.

5. The anti-jet joint structure as claimed in claim 4, wherein the valve bolt includes a locking disc engaged on the recessed section between the cap and the knob.

6. The anti-jet joint structure as claimed in claim 3, wherein the tab of the valve bolt moves in the passage of the first stepped shoulder.

7. The anti-jet joint structure as claimed in claim 4, wherein the valve bolt includes a washer having a bore and disposed in the threaded hole of the second fitting sleeve to abut against the first stepped shoulder; and a second seal ring is disposed in the locating segment of the second fitting sleeve, such that the second seal ring, the spring, the cap, the washer, and the locating segment of the second fitting sleeve are accommodated in the first connection assembly, wherein the locating segment is screwable with the first opening in which the base is received, the male threads of the locating segment screwable with the female threads of the first opening of the first fitting sleeve.

8. The anti-jet joint structure as claimed in claim 7, wherein the first fitting sleeve includes multiple recesses formed on a distal end of the first opening; at least one retainer is defined between the locating segment and the threaded hole of the second fitting sleeve, and the at least one retainer of the second fitting sleeve is retained with the multiple recesses of the first fitting sleeve.

9. The anti-jet joint structure as claimed in claim 1, wherein a diameter A of the first stepped shoulder is equal to a diameter B of the second stepped shoulder, and the diameter B of the second stepped shoulder is greater than a diameter C of the aperture of the stop shoulder.

10. The anti-jet joint structure as claimed in claim 1, wherein a nut is accommodated in the second end of the second fitting sleeve opposite the locating segment, the nut comprising multiple teeth longitudinally formed on an outer wall thereof, wherein a respective one of multiple cutouts is defined between any two adjacent teeth, and the respective one cutout is engagable with a respective one of multiple defining wings of the second fitting sleeve, such that the nut is connected with the second fitting sleeve, wherein a limitation protrusion is formed on the second end of the second fitting sleeve opposite the locating segment so as to contact with an external fringe of the nut.

* * * * *